July 4, 1972 P. K. PATEL ET AL 3,674,554
FORMATION OF OXIDE COATING ON SURFACE OF A MAGNETIC COBALT NICKEL ALLOY
Filed July 23, 1970
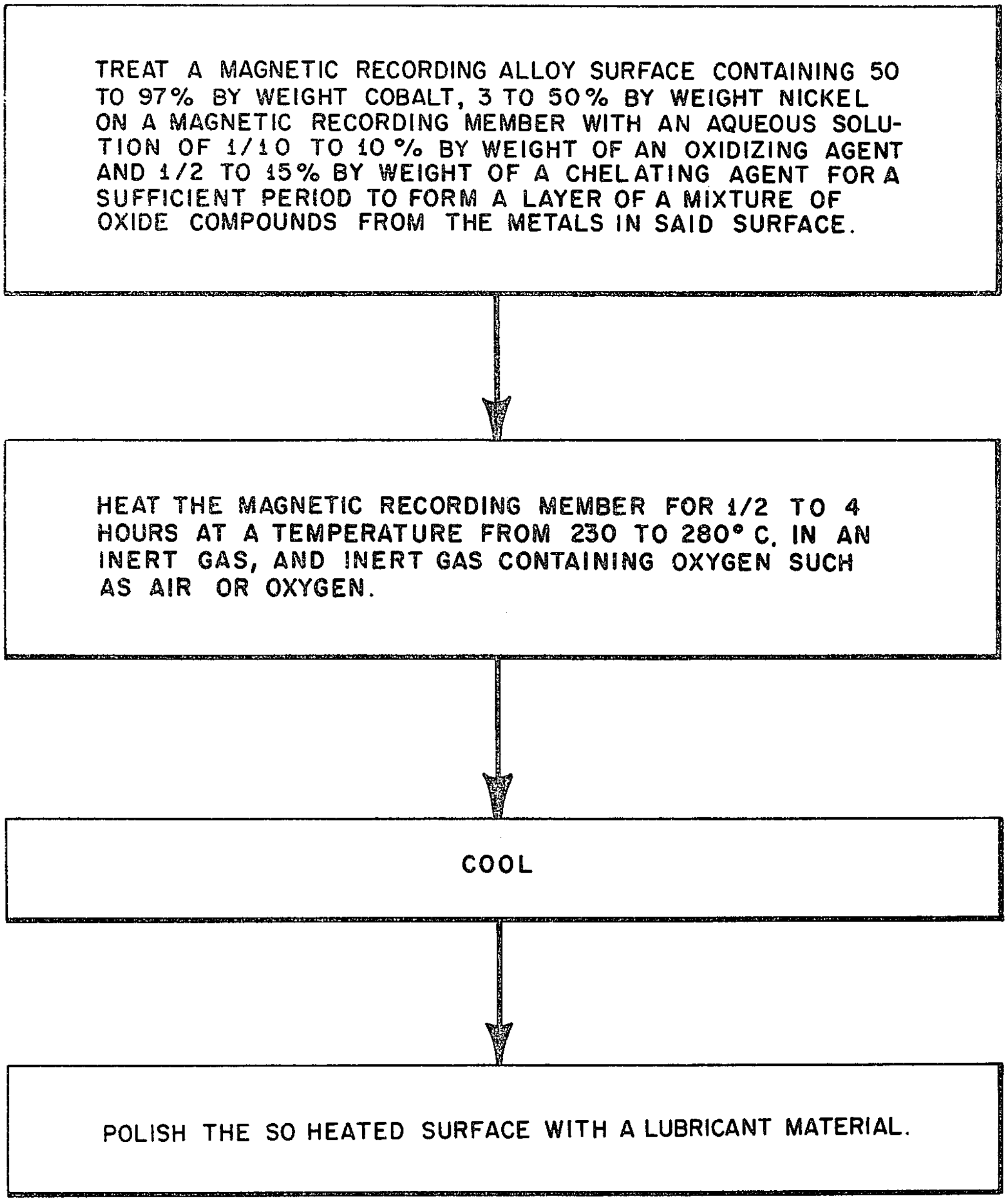
INVENTORS
PRAVIN K. PATEL
ELIOT STONE
BY Louis A. Kline
Joseph R. Dwyer
THEIR ATTORNEYS

United States Patent Office 3,674,554
Patented July 4, 1972

3,674,554

FORMATION OF OXIDE COATING ON SURFACE OF A MAGNETIC COBALT NICKEL ALLOY

Pravin K. Patel and Eliot Stone, Los Angeles, Calif., assignors to The National Cash Register Company, Dayton, Ohio Filed July 23, 1970, Ser. No. 57,671
Int. Cl. H01f *10/00*
U.S. Cl. 117—237 9 Claims

ABSTRACT OF THE DISCLOSURE

A protective oxide film may be located on the surface of a cobalt nickel magnetic alloy by treating the surface of such an alloy with an aqueous solution of an inorganic oxidizing agent and an organic chelating agent capable of buffering the solution so as to oxidize the surface. Such treatment is preferably carried on for sufficiently long periods to form an adherent, substantially continuous oxide layer from metal in the alloy. The concentration of the ingredients in the treatment solution can be varied depending upon the specific ingredients used, the reactivity of the particular alloy being treated, the temperature of the treatment solution and the thickness of the oxide film desired. After such treatment the alloy surface is preferably washed so as to remove entrained ingredients and then is preferably heated at a temperature of from 230 to 280° C. for a period of from one-half to four hours in either an inert atmosphere, an oxygen atmosphere or an atmosphere containing oxygen and one or more inert or substantially inert gases.

CROSS-REFERENCE TO RELATED APPLICATIONS

U.S. patent application entitled "Magnetic Record Members Having a Protective Recording Surface and Method of Making the Same filed Jan. 9, 1969 Ser. No. 790,129.

BACKGROUND OF THE INVENTION

For reasons which are unimportant to an understanding of the present invention magnetic record members have been and are being constructed so as to utilize a suitable support covered with a cobalt containing alloy serving as a magnetic recording film or medium. Structures of this type are publicly known. One such structure of this type is shown in the Peters et al. U.S. Pat. No. 3,466,156 issued Sept. 9, 1969 entitled "Magnetic Record Members."

Magnetic record members disclosed in this Peters et al. patent utilize an aluminum alloy disc serving as a support member covered with successive layers of zinc, nickel, a cobalt-phosphorus alloy, a protective composition produced from a resin and a wax or wax type lubricant. In a structure of that type the cobalt-phosphorus alloy serves as a recording medium and the overlying layers produced of a polymer and of a wax type lubricant serve to protect the cobalt alloy layer from damage during the use of a complete magnetic record member.

In the past, difficulties encountered with a protective composition produced from a resin as described in the aforenoted Peters et al. U.S. patent have motivated the development of various techniques to produce somewhat different protective compositions or protective composition layers on a cobalt alloy magnetic recording medium. Such alternative procedures are indicated in the co-pending U.S. patent application entitled "Magnetic Record Members Having a Protective Recording Surface and Method of Making the Same" filed Jan. 9, 1969, Ser. No. 790,129. One of these procedures which is considered to be particularly advantageous for reasons which are unimportant to an understanding of this invention involves contacting the surface of a cobalt-phosphorus magnetic recording alloy with nitric acid, rinsing the surface after such contact and then heating the alloy for a period of one-half to four hours at a temperature of from 230 to 260° F.

Developments in the magnetic recording field have made it desirable to utilize magnetic record members comprising cobalt-nickel magnetic alloys instead of cobalt-phosphorus magnetic alloys. Surprisingly it has been found that the procedure of contacting such as alloy with nitric acid as indicated in the preceding discussion cannot be satisfactorily utilized with such nickel containing cobalt alloys. For reasons which are not understood such cobalt-nickel alloys react much more rapidly with a solution of nitric acid than cobalt-phosphorus alloys so as to tend to be excessively etched by such a solution. This has made it extremely difficult if not impossible to adequately control an acid treatment as described in the aforenoted co-pending U.S. patent application in order to obtain a protective film of a desired nature without damage to the cobalt alloy substrate serving to support such a film.

SUMMARY OF THE INVENTION

An objective of the present invention is to provide a new and improved process for providing an oxide protective film upon a cobalt-nickel magnetic alloy recording surface. More specifically an objective of the present invention is to provide a process for this purpose which can be adequately controlled so as to provide on the surface of such an alloy an oxide protective film or layer of uniform characteristics and physical dimensions without detrimentally damaging the cobalt-nickel magnetic alloy substrate. A further objective of this invention is to provide a process of the type indicated which is reliable, which may be easily carried out and which is relatively inexpensive.

In accordance with this invention these objectives are achieved by treating the surface of a nickel containing cobalt magnetic alloy with an aqueous oxidizing solution of at least one inorganic oxidizing agent and at least one organic chelating agent capable of buffering the solution for a sufficient period so as to oxidize the surface. After such treatment the alloy surface is preferably washed so as to remove entrained ingredients and then is heated to adequately develop a protective layer having desired physical properties sufficient to adequately protect the alloy surface from abrasion or the like such as might be encountered during relative motion between a magnetic record member and a head used with such a member.

BRIEF DESCRIPTION OF THE DRAWING

Further details of this invention as well as various advantages of it will be apparent from a careful consideration of the remainder of this specification and of the accompanying drawing, which indicates diagrammatically the steps of a presently preferred manner of carrying out the process of the invention.

DETAILED DESCRIPTION

As indicated in the drawing the initial step in carrying out the process of the present invention involves treating the surface of a cobalt-nickel magnetic alloy with an aqueous solution of at least one inorganic oxidizing agent and at least one organic chelating agent capable of buffering the solution. To have desired properties for use as a magnetic recording medium such a surface should contain at least 50% by weight cobalt. It may also contain minor amounts of nickel, phosphorus and various other metals. A particularly suitable alloy for use as a magnetic recording medium contains 70% by weight of cobalt, 5% by weight phosphorus and 25% by weight nickel. Unless such an alloy contains at least 3% by weight nickel it is considered to be sufficiently unreactive so as not to require the utilization of the present invention in the production of a protective film upon it.

From this it will be apparent that the present invention may be and should be utilized with magnetic recording alloys containing from 50 to 97% by weight cobalt and from 3% to 50% by weight nickel and, if other secondary ingredients than nickel are present from 3% to 50% by weight nickel and such secondary ingredients. Preferably in a magnetic recording member such an alloy is present in a comparatively thin uniform film of from about 14 to about 20 microinches thick. It is considered that usable structures can be created using an alloy layer from about 3 to about 100 microinches thick. For satisfactory use in a disc system such an alloy should have a coercivity of from about 200 to 700 oersteds.

The solution used in treating an alloy surface as described may contain any water soluble, easily handled, inorganic oxidizing agent. Many such different agents are well-known and are commonly utilized for oxidizing purposes. Particularly suited for use with the process of the present invention are inorganic material acids such as nitric acid. Of these acids nitric acid is presently preferred since this acid is easily available, will not contaminate the alloy surface, can be easily handled and readily enters into desired reactions. Other known inorganic oxidizing agents such as hydrogen peroxide, potassium chlorate, sodium hypochlorite, potassium permanganate, sodium dichromate and the like can be utilized. Mixtures of these oxidizing agents may be employed.

An organic chelating agent which may be employed in an aqueous treatment solution as described may be any water soluble chelating agent which will act as a metal buffering agent to maintain a nearly constant concentration of metal ions at almost any specific level of concentration of the oxidizing agent or agents used in an aqueous treatment solution. Such chelating agents are not be be confused with many agents which may be added to a solution so as to buffer the solution. Strictly speaking, a buffered solution is a solution to which moderate amounts of either a strong acid or base may be added without causing any large change in the pH value. Many inorganic salts may be used either with another salt or with a weak acid to obtain such a buffered solution. The organic materials usable with the present invention do not act strictly as an inorganic salt in a buffered solution, but rather act as sequestrating or chelating agents so as to tend to "hold" metal ions in solution by the formation of complexes.

A number of such chelating agents are well-known. Amongst suitable agents are ethylenediaminetetracetic acid (EDTA), tartaric acid, gluconic acid, succinic acid, citric acid, thiourea and the like. It will be recognized that various derivatives of these particular compounds and compounds which are related to these compounds in their structural features are commonly considered to be functional equivalents of these compounds as chelating and buffering agents. Sodium or similiar salts of various acids as indicated can be satisfactorily employed instead of the acids themselves. At the present time it is considered preferable to use with the invention citric acid or its sodium salts since these compounds are inexpensive, conveniently available and are operative in moderate quantities to adequately buffer a solution as employed with this invention so as to effectively control the rate of the reactions which transpire on the surface of magnetic alloys as described. Mixtures of various agents as herein described can be employed.

These reactions are oxidation reactions leading to the formation upon the surface of an alloy as indicated of a layer which is considered to be composed of a mixture of oxides, hydroxides and oxide hydrates. The term "oxide hydrates" is used herein in conjunction with the expression "hydroxide" even though it is not a commonly used expression because of the comparatively complex nature of oxide type compounds capable of being formed from metals such as cobalt and nickel upon aqueous oxidation. It is considered that this layer is a mixture of compounds of all of the metals present in an alloy surface as described, but that the proportions of compounds of specific metals in the layer will be different from the proportions of the metals in the alloy surface because of the different rates of reactivity of different metals.

It is desired to form in accordance with this invention a layer of oxide or oxide-type materials as indicated upon the surface of a magnetic alloy as described which is adherent, subtantially continuous and of substantially uniform characteristics throughout the surface of the alloy without attacking the alloy material to any noticeable extent in the manner in which metals such as aluminum are chemically attacked by etching so as to increase their effective as opposed to apparent surface areas. The use of a chelating agent serving to buffer an oxidizing solution as herein described has proven to be effective in enabling a desired type of surface coating to be produced without noticeably or significantly damaging the surface of a magnetic cobalt-nickel alloy.

Nevertheless, in practicing this invention some of the material in the surface of an alloy as described is consumed or reacted so as to produce an oxide type composition as indicated. The amount of such a surface consumed can be utilized as a guide in accordance with this invention in order to determine whether an oxide type layer as indicated of adequate thickness to provide ultimate abrasion protection is achieved. It is presently preferred to carry out the oxidation step of the invention so that about two microinches of the surface of a magnetic alloy is converted into an oxide type complex layer or film as described. This is because this amount of metal when so converted will provide an adherent oxide film which provides adequate protection to the magnetic alloy for most practical purposes.

It is considered that an oxide layer created during this oxidation step from about one-quarter microinch of the surface of the magnetic alloy will provide in an ultimate magnetic recording member some resistance to abrasion. It is also considered that if more than about five microinches of the surface of the metal alloy are consumed during this oxidation there may be some tendency for uneven metal attack or etching. This would be disadvantageous since it would affect the uniformity of the magnetic characteristics of the mangetic alloy surface, even though a comparatively thick ultimate oxide layer created by the process herein described would tend to provide a greater degree of resistance to abrasion than a thinner layer.

In practicing the process of the present invention it is necessary or desirable to control the concentration of the reagents in the oxidizing bath so that at the temperature at which this step of the process of this invention is carried out the oxidation reactions are rapid enough so as not to take an undue amount of time and yet are not so rapid that there is danger of over attack on a metal surface. From this it will be recognized that such control involves a number of factors which can be considered as continuous variables.

At least in theory it is possible to carry out the process of the present invention at any temperature from just above the freezing point of the oxidation solution used to just below a temperature at which compounds within the solution tend to break down. In general the greater the temperature, the greater the speed of the reactions achieved. For practical reasons it is considered desirable to carry out the oxidation step described within a normal range of ambient temperatures of from about 68° F. to 100° F.

In general the higher the concentration of the oxidizing agent used in the oxidizing solution, the more rapid the attack on the metal surface. However, an important factor with the present invention is the fact that the use of a buffer-type chelating compound as herein described tends to moderate or control the reactions which transpire on the surface of a cobalt-nickel alloy to rates which are within a usable range so that a desired oxide-type layer can be created. Thus, the use of chelating agents as herein indicated can be considered to slow down or control the reactivity of the surface of a cobalt-nickel magnetic alloy as far as the oxidation of such a surface is concerned. In effect, a chelating agent as herein described tends to overcome what appears to be a catalytic effect of nickel in promoting the oxidation of a cobalt or essentially cobalt type surface.

Because of the action of a chelating-type agent in buffering an oxidizing solution so as to control metal attack, it will be apparent that the concentration of a buffering or chelating agent as used in such a solution in accordance with this invention can be varied within comparatively wide limits. It is considered that if less than about $\frac{1}{10}$ percent by weight of a chelating agent is used in such solution the quantity of such an agent will be so small as to obtain no significant control of the oxidation action achieved. On the other hand, it is considered that in general the greater amount of the chelating agent used the greater the degree of control of metal attack up to a point of diminishing return below the maximum solubility of the chelating agent in the solution employed.

From this it will be apparent that the relative proportions with the two types of reagents used in an oxidizing solution as herein described may be varied between comparatively wide limits. In general the more reactive the oxidizing agent the greater the amount of buffer required and conversely the less reactive the oxidizing agent the lower amount of chelating agent required.

It has been found that satisfactory results can be achieved on cobalt-nickel alloy surfaces as described utilizing in solution from about $\frac{1}{10}$% to 10% by weight of an oxidizing agent and from about ½% to 15% by weight of a chelating agent as indicated. In general if lesser quantities of a chelating agent than are specified are used at room temperature the reactions become too fast for practical production purposes, but if greater quantities are used the reactions become too slow for practical production purposes. In a similar manner if lesser quantities of an oxidizing agent than are specified are employed the reactions become too slow for practical production purposes, but if greater quantities than are specified are used, the reactions become too rapid to control under normal production procedures. It will be realized that the ranges specified are not absolute and that for practical purposes with exceedingly reactive oxidizing agents or exceedingly slow oxidizing agents or with exceedingly ineffective or over effective chelating agents the process can be carried out with a solution containing amounts of ingredients outside of the specified ranges.

In carrying out the process after an oxide type layer has been created of a desired thickness the alloy surface treated with a solution as described is preferably removed from the solution and washed with distilled water or deionized water to remove any surface entrained material. Then, as the next step in the process, the alloy surface is preferably heated in either oxygen, a gas containing oxygen and inert gases, or substantially inert gases, such as in air, or an inert gas so as to give to the oxide layer created desired ultimate physical properties.

Such heating serves to drive off water held in the oxidized layer in either the form of a hydroxide or an oxide hydrate type composition so that all that remains is essentially a surface of oxides of the metals within the surface of the cobalt-nickel alloy layer plus perhaps some minor quantities of hydroxides which are not decomposed at the temperatures employed during the heating operation. When the heating is carried out in oxygen or an oxygen containing gas, the oxide layer will tend to grow.

It is preferred to carry out this final heating operation at a temperature of from about 230 to 280° C. If lower temperatures are employed an oxide surface tends to be undesirably "soft" and not to possess desired resistance to abrasion. If temperatures above this range are used the magnetic properties of a cobalt-nickel alloy tend to be undesirably affected.

Similarly it is preferred that the heating be carried out for a period of from about ½ to 4 hours. If shorter periods are used the oxide film produced tends to be undesirably weak, and not possess the desired resistance to abrasion. On the other hand, if the heating is carried out for a greater period than indicated the magnetic properties of a cobalt-nickel alloy as herein indicated tend to be detrimentally affected.

Following a heating operation as indicated, a structure which has been oxidized and heated as described is cooled to room temperature. Such cooling may be effected by merely taking such a structure from an oven into ambient air. The structure can then be directly utilized as a magnetic record member.

However, prior to such use it is preferred to apply to the treated surface a solid or liquid lubricant such as a common wax, a low vapor pressure pentroleum oil, a silicone oil or the like and then to polish the lubricant on the surface so as to obtain a very nearly monomolecular layer of the lubricant on the surface. The lubricant used will normally protect against corrosion and act to reduce dynamic friction during the use of a magnetic record member. Such a lubricant will also tend to reduce galling. The lubricant also will tend to fill in any defects which may appear in an oxide layer created as herein described. Such a lubricant may contain a minor quantity such as from 0 to 5% by weight of an antioxidant in order to provide corrosion protection.

The following specific examples are given in order to facilitate an understanding of this invention. It is to be understood that these examples do not set forth or indicate all of the materials which may be used in practicing the invention or all of the parameters of the invention.

Example 1

A magnetic record member carrying a cobalt-nickel-phosphorus alloy containing 70% by weight cobalt, 5% by weight phosphorus and 25% by weight nickel as an adherent layer about 14 microinches thick on an aluminum disc can be treated at 72° F. with an aqueous solution containing 2 gms. per liter nitric acid and 20 gms. per liter trisodium citrate. After 2 microinches of the surface of said alloy has been oxidized the member can be removed from the solution, washed with distilled water, and then heated in air at a temperature of about 250° C. for a period of 2 hours. After this, the so treated member may be cooled in ambient air. The exposed surface can then be polished with a known lubricant such as a silicone oil.

Example 2

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 40 ml. of 0.058 M ethylenediaminetetracetic acid added to a liter of water containing 20 gms. of oxalic acid for a period of 8 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 3

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 20 gms. per liter of oxalic acid and 20 gms. per liter of succinic acid in a liter of water for a period of 8 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 4

A magnetic record member carrying a nickel-cobalt-phosphorus alloy containing 19% by weight nickel, 75% by weight cobalt and 6% by weight phosphrous on an aluminum disc can be treated at 72° F. with an aqueous solution of 10 ml. of 93% by weight of sulfuric acid and 80 ml. of 0.058 M ethylenediaminetetracetic acid added to a liter of water containing 2.5 gms. of potassium dichromate for a period of 2 minutes. The record member can then be washed and then heated in air at 275° C. for a period of hours. After this the so treated member will acquire a blue type color and may be cooled in ambient air. The exposed surface can then be polished with a known lubricant such as a silicone oil.

Example 5

A magnetic record member carrying a nickel-cobalt-phosphorus alloy containing 19% by weight nickel, 75% by weight cobalt and 6% by weight phosphorus on an aluminum disc can be treated at 72° F. with a mixture of 40 ml. of 30% by weight hydrogen peroxide and 100 ml. of 0.058 M ethylenediaminetetracetic acid added to a liter of water for a period of 2 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 6

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 10 ml. of 93% by weight sulfuric acid, 80 ml. of 0.058 M ethylenediaminetetracetic acid added to a liter of water containing 3 gms. potassium permanganate for a period of 4 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubrican such as a silicone oil.

Example 7

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 20 gms. oxalic acid, 10 gms. per liter thiourea for a period of 8 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 8

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 10 ml. of 93% sulfuric acid added to a liter of water containing 2 gms. potassium dichromate and 10 gms. succinic acid for a period of 2 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 9

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 10 ml. of 93% by weight sulfuric acid added to a liter of water containing 2 gms. potassium dichromate and 20 gms. thiourea for a period of 2 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 10

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 10 ml. of 93% by weight sulfuric acid added to a liter of water containing 4 gms. potassium permanganate and 20 gms. thiourea for a period of 4 minutes so as to produce an oxidic type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 11

A magnetic record member carrying a nickel-cobalt-phosphorus alloy containing 19% by weight nickel, 75% by weight cobalt and 6% by weight phosphorus on an aluminum disc can be treated at 72° F. added to a mixture of 40 ml. of a water solution containing 30% by weight hydrogen peroxide and a liter of water containing 20 gms. thiourea for 2 minutes so as to produce an oxide type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 12

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 40 ml. of a water solution containing 30% by weight hydrogen peroxide added to a liter of water containing 20 gms. succinic acid for a period of 2 minutes so as to produce an oxide type layer of a straw like color. The record member can then be washed and the heated in air at 275° C. for a period of 2 hours. After this the so treated member will acquire a blue type color and may be cooled in ambient air. The exposed surface can then be polished with a known lubricant such as a silicone oil.

Example 13

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 10 ml. concentrated nitric acid and 5 gms. of thiourea added to a liter of water for a period of 6 minutes so as to produce an oxide type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 14

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 80 ml. of 0.058 M ethylenediaminetetracetic acid in water added to a liter of water containing 10 ml. of concentrated nitric acid for a period of 6 minutes so as to produce an oxide type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

Example 15

A magnetic record member carrying a nickel-cobalt-phosphorus alloy containing 19% by weight nickel, 75% by weight cobalt and 6% by weight phosphorus on an aluminum disc can be treated at 72° F. with an aqueous solution of 10 ml. concentrated nitric acid and 30 gms. tartaric acid per liter of water for a period of 6 minutes so as to produce an oxide type layer of a straw like color. The record member can then be washed and then heated in air at 275° C. for a period of 2 hours. After this the so treated member will acquire a blue type color and may be cooled in ambient air. The exposed surface can then be polished with a known lubricant such as a silicone oil.

We claim:

1. A process for providing a protective oxide film upon a surface of a cobalt-nickel magnetic alloy containing at least 3% by weight nickel which comprises:
treating said surface with aqueous solution of an inorganic oxidizing agent capable of oxidizing said surface and an organic chelating agent capable of buffering said solution until said oxidizing agent reacts with said surface to form a layer of a mixture of oxide compounds from the material in said surface, and
heating the so treated surface at a temperature of from 230 to 280° C. for a period of from ½ to 4 hours in a gas selected from the group consisting of oxygen and inert gases in order to convert said layer into a protective oxide film.

2. A process as claimed in claim 1 wherein:
said surface contains from 50 to 97% by weight cobalt and 3 to 50% by weight nickel and said cobalt and nickel being present in a film of from about .3 to 100 microinches thick, said cobalt and nickel in said film having a coercivity of from 200 to 500 oersteds.

3. A process as claimed in claim 1 wherein:
said oxidizing agent is selected from the group consisting of nitric acid, hydrogen peroxide, soluble chlorates, hypochlorites, permanganates, and dichromates.

4. A process as claimed in claim 1 wherein:
said chelating agent is selected from the group consisting of ethylenediaminetetracetic acid, tartaric acid, gluconic acid, succinic acid, citric acid, and thiourea.

5. A process as claimed in claim 1 wherein:
said surface is treated with said solution until the surface is oxidized to a depth of at least ¼ microinch.

6. A process as claimed in claim 1 wherein:
said surface is treated with said solution until the surface is oxidized to a depth of from about 1 microinch to about 5 microinches.

7. A process as claimed in claim 1 wherein:
said solution contains from about 0.1 to 10% by weight of said oxidizing agent and from ½ to 15% by weight of said chelating agent.

8. A process as claimed in claim 1 wherein:
said surface contains from 50 to 97% by weight cobalt and 3 to 50% by weight nickel and said cobalt and nickel being present in a film of from about 3 to 100 microinches thick, said cobalt and nickel in said film having a coercivity of from 200 to 500 oersteds,
said oxidizing agent is selected from the group consisting of nitric acid, hydrogen peroxide, soluble chlorates, hypochlorites, permanganates, and dichromates,
said chelating agent is selected from the group consisting of ethylenediaminetetracetic acid, tartaric acid, gluconic acid, succinic acid, citric acid, and thiourea,
said solution contains from about 0.1 to 10% by weight of said oxidizing agent and from ½ to 15% by weight of said chelating agent, and
said surface is treated with said solution until the surface is oxidized to a depth of at least ¼ microinch.

9. A process as claimed in claim 8 wherein:
said surface is treated with said solution until the surface is oxidized to a depth of from about 1 microinch to about 5 microinches.

References Cited

UNITED STATES PATENTS

| | | | |
|---|---|---|---|
| 3,460,968 | 8/1969 | Bate et al. | 117—237 X |
| 2,819,192 | 1/1958 | Young | 148—6.14 |
| 2,730,491 | 1/1956 | Moline et al. | 117—240 X |

MURRAY KATZ, Primary Examiner

B. D. PIANALTO, Assistant Examiner

U.S. Cl. X.R.

117—62, 64, 239, 240; 148—6.14